United States Patent
Oakes

(10) Patent No.: US 10,309,695 B2
(45) Date of Patent: Jun. 4, 2019

(54) METHODS AND APPARATUSES FOR MAINTAINING TEMPERATURE DIFFERENTIAL IN MATERIALS USING THERMOELECTRIC DEVICES DURING HOT BONDED REPAIR

(71) Applicant: THE BOEING COMPANY, Chicago, IL (US)

(72) Inventor: Gary D. Oakes, Renton, WA (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 15/232,200

(22) Filed: Aug. 9, 2016

(65) Prior Publication Data

US 2018/0045438 A1    Feb. 15, 2018

(51) Int. Cl.
| | |
|---|---|
| B29C 35/02 | (2006.01) |
| B29C 65/30 | (2006.01) |
| B29C 73/34 | (2006.01) |
| B29L 31/30 | (2006.01) |
| F25B 21/02 | (2006.01) |
| F25B 21/04 | (2006.01) |

(52) U.S. Cl.
CPC .......... *F25B 21/02* (2013.01); *B29C 35/0266* (2013.01); *B29C 65/30* (2013.01); *B29C 73/34* (2013.01); *B29C 2035/0216* (2013.01); *B29L 2031/3076* (2013.01); *F25B 21/04* (2013.01)

(58) Field of Classification Search
CPC ...... F25B 21/02; F25B 21/04; B29C 35/0266; B29C 65/30; B29C 73/34; B29C 2035/0216; B29L 2031/3076
See application file for complete search history.

(56) References Cited

U.S. PATENT DOCUMENTS

| | | | | |
|---|---|---|---|---|
| 5,442,156 A | * | 8/1995 | Westerman | H05B 3/00 219/243 |
| 2010/0132875 A1 | | 6/2010 | Ackerman et al. | |
| 2011/0139769 A1 | * | 6/2011 | Miller | B29C 73/30 219/634 |
| 2012/0145703 A1 | | 6/2012 | Matsen et al. | |
| 2015/0001768 A1 | | 1/2015 | Kia et al. | |

FOREIGN PATENT DOCUMENTS

JP        2009208301 A     9/2009

OTHER PUBLICATIONS

Extended European Search Report for EP Application No. 17184725 dated Mar. 29, 2018.

* cited by examiner

*Primary Examiner* — William P Fletcher, III
(74) *Attorney, Agent, or Firm* — Coats & Bennett, PLLC

(57) ABSTRACT

Methods, systems, and apparatuses for repairing a composite material in situ are disclosed including maintaining and controlling the temperature of a material adjoining a composite material in situ, while the composite material is being heating during a composite material repair, such repair accomplished by positioning a heat source proximate to a first side of the composite material and positioning a thermoelectric device proximate to a structure located proximate to the second of the composite material, and substantially maintaining the temperature of the structure at a temperature that is different than a temperature of the composite material.

17 Claims, 4 Drawing Sheets

METHODS AND APPARATUSES FOR MAINTAINING TEMPERATURE DIFFERENTIAL IN MATERIALS USING THERMOELECTRIC DEVICES DURING HOT BONDED REPAIR

TECHNOLOGICAL FIELD

The present disclosure generally relates to the field of hot bonded composite material reworking and repair. More particularly, the present disclosure relates to hot bonded reworking and repairing of composite materials in situ, and controlling temperatures of materials adjoining or proximate to heated reworked composite materials.

BACKGROUND

In the field of composite material repair, or rework, heat is often applied to a region of the composite material requiring repair, or rework. Structures, including, but not limited to stationary structures and objects, as well as vehicles, including, but not limited to aircraft are being designed and manufactured with increasing percentages of parts made from composite materials. Composite materials offer desired strength with less weight as compared to, for example, metal-containing parts. In the case of aircraft and other vehicles, the decreased weight afforded by the use of composite materials improves performance features including, for example, payload capacity and fuel efficiency. In addition, composite materials generally provide longer service life for various components on vehicles, including, for example, aircraft.

Composite materials are understood to be strong, lightweight materials created by combining two or more compositions. For example, composite materials often include reinforcing fibers bound in a polymer resin matrix. Resins used in composite materials may be thermoset or thermoplastic resins. A composite material made with a thermoplastic resin may become soft upon heating, may re-harden upon cooling, and may be able to be repeatedly heated and cooled.

During manufacturing of composite materials, such materials may have localized areas containing one or more inconsistencies or irregularities. Such inconsistencies or irregularities may undesirably influence properties of the components or parts made from the composite material. As a result, such areas of the parts made from composite material having such areas of inconsistencies or irregularities must be repaired or "reworked" to improve the properties and performance of the part as well as the overall structure comprising the part.

Repairs can be performed on composite materials using mechanical systems over inconsistencies with the mechanical systems secured using mechanical fasteners. However, the use of mechanical systems for composite material repair may not be possible for certain composite parts. In addition, the use of mechanical repair solutions can increase the stress concentration at the site of composite irregularities.

Localized heating in the form of, for example, hot bonded repair, of composite materials at the localized site or region of composite material irregularities has been used as a method for reworking some composite materials. However, the localized heating can damage or otherwise adversely impact composite and non-composite materials that adjoin or are otherwise proximate to the composite material being reworked.

Efforts have been made to maintain, regulate and otherwise control the temperature of structures that adjoin composite parts that are being reworked and subjected to heating. Such efforts have included applying conditioned air to the structures, applying chilled apparatuses such as, for example, shot bags containing chilled metal pellets, separating and insulating structures from the composite materials being reworked, etc. In some cases, it has been necessary to remove adjoining structures, parts and components that are thermally sensitive from their installed locations when reworking composite parts via heating. Such part removal and re-installation increases the risk of additional part damage during removal and re-installation, and is time-consuming, labor intensive, and costly.

BRIEF SUMMARY

An aspect of the present disclosure is directed to a method comprising positioning a heat source proximate to a first side of a composite material, with the composite material having a first side and a second side, with a structure located proximate to the second side of the composite material, and with the structure having a first side and a second side, with the first side of the structure located proximate to the second side of the composite material; positioning a thermoelectric device proximate to the second side of the structure, with the thermoelectric device in communication with a controller; contacting the second side of the structure with a temperature sensing device, with the temperature sensing device in communication with the controller, activating the heat source; applying heat from the heat source to the first side of the composite material, heating the composite material to a first temperature; providing an electric current to the thermoelectric device; and substantially maintaining the temperature of the structure at a second temperature that is different than the temperature of the composite material.

In a further aspect, in the step of positioning a heat source proximate to a first side of a composite material, the heat source comprises a heat blanket.

In another aspect, in the step of positioning a heat source proximate to a first side of a composite material, the structure comprises a material different from the composite material.

In a further aspect, in the step of positioning a heat source proximate to a first side of a composite material, the structure comprises a metallic material.

In yet another aspect, in the step of positioning a thermoelectric device proximate to the second side of the structure, the thermoelectric device is a Peltier device.

In still another aspect, in the step of substantially maintaining the temperature of the structure at a second temperature that is different from the temperature of the composite material, the second temperature is less than the first temperature of the composite material.

In a further aspect, before the step of substantially maintaining the temperature of the structure at a second temperature that is different from the temperature of the composite material, further comprising monitoring the temperature of the structure.

In yet another aspect, in the step of substantially maintaining the temperature of the structure at a second temperature that is different from the temperature of the composite material, the temperature of the structure is maintained at a second temperature that is less than the first temperature of the composite material.

In a further aspect, in the step of substantially maintaining the temperature of the structure at a second temperature that is different from the temperature of the composite material, the difference between the second temperature of the structure and the first temperature of the composite material ranges from about 20° F. to about 150° F.

According to a further aspect, the above-disclosed method further comprises the step of repairing the composite material.

According to the present disclosure, a further aspect is directed to a device for maintaining a temperature difference between a composite first material located proximate to a second material during the repair of the composite first material comprising a thermoelectric device positioned proximate to the second material.

In another aspect, the thermoelectric device is configured to contact the second material.

In a further aspect, the second material comprises a metallic material.

In yet another aspect, the thermoelectric device comprises a Peltier device.

In a further aspect, the temperature difference between the composite first material and the second material ranges from about 20° F. to about 150° F.

In still another aspect, the thermoelectric device comprises a thermocouple.

In another aspect, the thermoelectric device is in communication with a thermocouple.

Yet another aspect is directed to a component comprising a repaired composite first material, said composite material repaired according to a method comprising positioning a heat source proximate to a first side of a composite material, with the composite material having a first side and a second side, with a structure located proximate to the second side of the composite material, with the structure having a first side and a second side, with the first side of the structure located proximate to the second side of the composite material; positioning a thermoelectric device proximate to the second side of the structure, with the thermoelectric device in communication with a controller; contacting the second side of the structure with a temperature sensing device, with the temperature sensing device in communication with the controller, activating the heat source; applying heat from the heat source to the first side of the composite material; heating the composite material to a first temperature, providing an electric current to the thermoelectric device, and substantially maintaining the temperature of the structure at a second temperature that is different than the first temperature of the composite material.

In yet another aspect, the thermoelectric device comprises a thermocouple.

In still another aspect, the thermoelectric device is in communication with a thermocouple.

In a further aspect, the thermocouple and the thermoelectric device are both in communication with a controller, with said controller configured to control a current directed from an electric source to the thermoelectric device.

In yet another aspect, a control system comprises the controller, wherein said control system is in communication with the thermoelectric device and the thermocouple.

A further aspect is directed to an object comprising a component comprising a repaired composite first material, said composite material repaired according to a method comprising positioning a heat source proximate to a first side of a composite material, with the composite material having a first side and a second side, with a structure located proximate to the second side of the composite material, with the structure having a first side and a second side, with the first side of the structure located proximate to the second side of the composite material; positioning a thermoelectric device proximate to the second side of the structure, said thermoelectric device in communication with a controller; contacting the second side of the structure with a temperature sensing device, with the temperature sensing device in communication with the controller, activating the heat source; applying heat from the heat source to the first side of the composite material; heating the composite material to a first temperature, providing an electric current to the thermoelectric device; and substantially maintaining the temperature of the structure at a second temperature that is different than the first temperature of the composite materials.

According to a further aspect, a stationary object comprises a component comprising a repaired composite first material, said composite material repaired according to a method comprising positioning a heat source proximate to a first side of a composite material, with the composite material having a first side and a second side, with a structure located proximate to the second side of the composite material, said structure having a first side and a second side, with the first side of the structure located proximate to the second side of the composite material; positioning a thermoelectric device proximate to the second side of the structure, said thermoelectric device in communication with a controller; contacting the second side of the structure with a temperature sensing device, with the temperature sensing device in communication with the controller; activating the heat source; applying heat from the heat source to the first side of the composite material; heating the composite material to a first temperature, providing an electric current to the thermoelectric device; and substantially maintaining the temperature of the structure at a second temperature that is different than the first temperature of the composite materials.

A still further aspect is directed to a vehicle comprising a component comprising a repaired composite first material, said composite material repaired according to a method comprising positioning a heat source proximate to a first side of a composite material, with the composite material having a first side and a second side, with a structure located proximate to the second side of the composite material, and with the structure having a first side and a second side, with the first side of the structure located proximate to the second side of the composite material; positioning a thermoelectric device proximate to the second side of the structure, with the thermoelectric device in communication with a controller, contacting the second side of the structure with a temperature sensing device, and with the temperature sensing device in communication with the controller; activating the heat source; applying heat from the heat source to the first side of the composite material, heating the composite material to a first temperature; providing an electric current to the thermoelectric device; and substantially maintaining the temperature of the structure at a second temperature that is different than the first temperature of the composite materials.

According to a further aspect, the vehicle comprises a manned aircraft, an unmanned aircraft, a manned spacecraft, an unmanned spacecraft, a satellite, a rocket, a missile, a manned terrestrial vehicle, an unmanned terrestrial vehicle, a manned water borne surface vehicle, an unmanned water borne surface vehicle, a manned water borne sub-surface vehicle, or an unmanned water borne sub-surface vehicle.

BRIEF DESCRIPTION OF THE DRAWINGS

Figure 1:
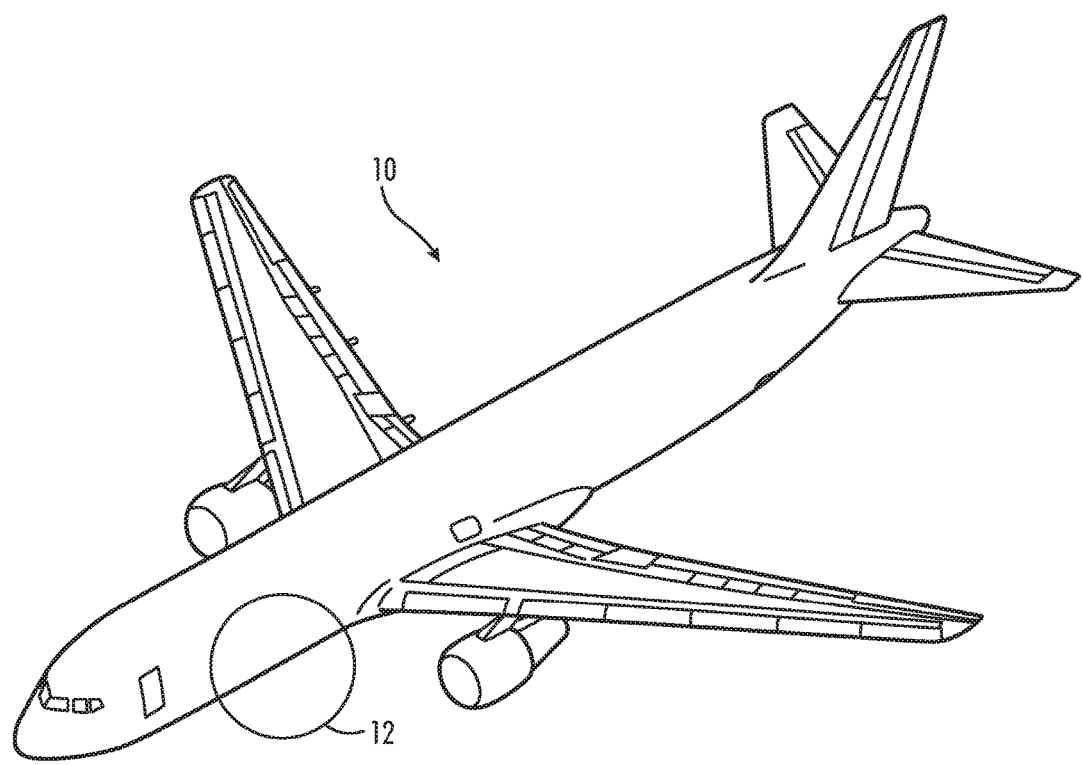
Figure 2:
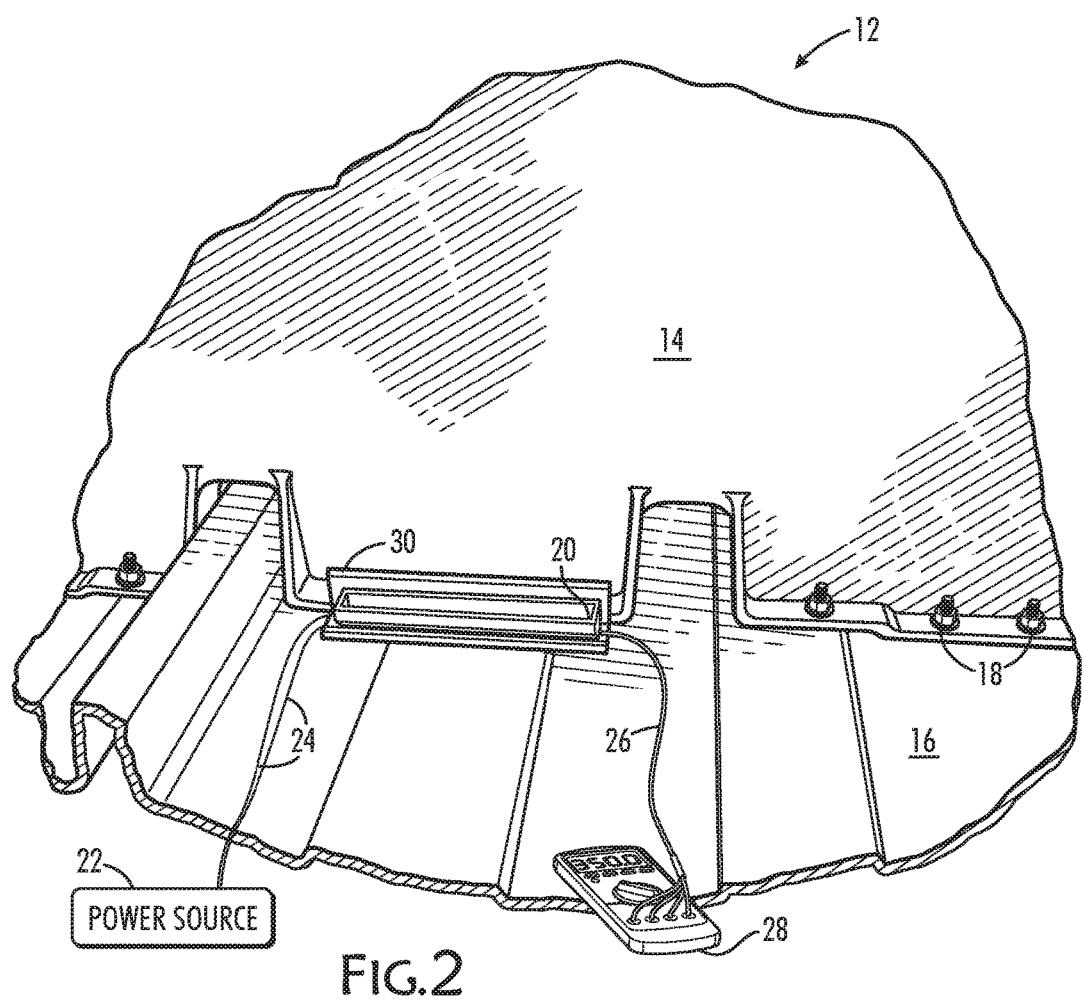
Figure 3:
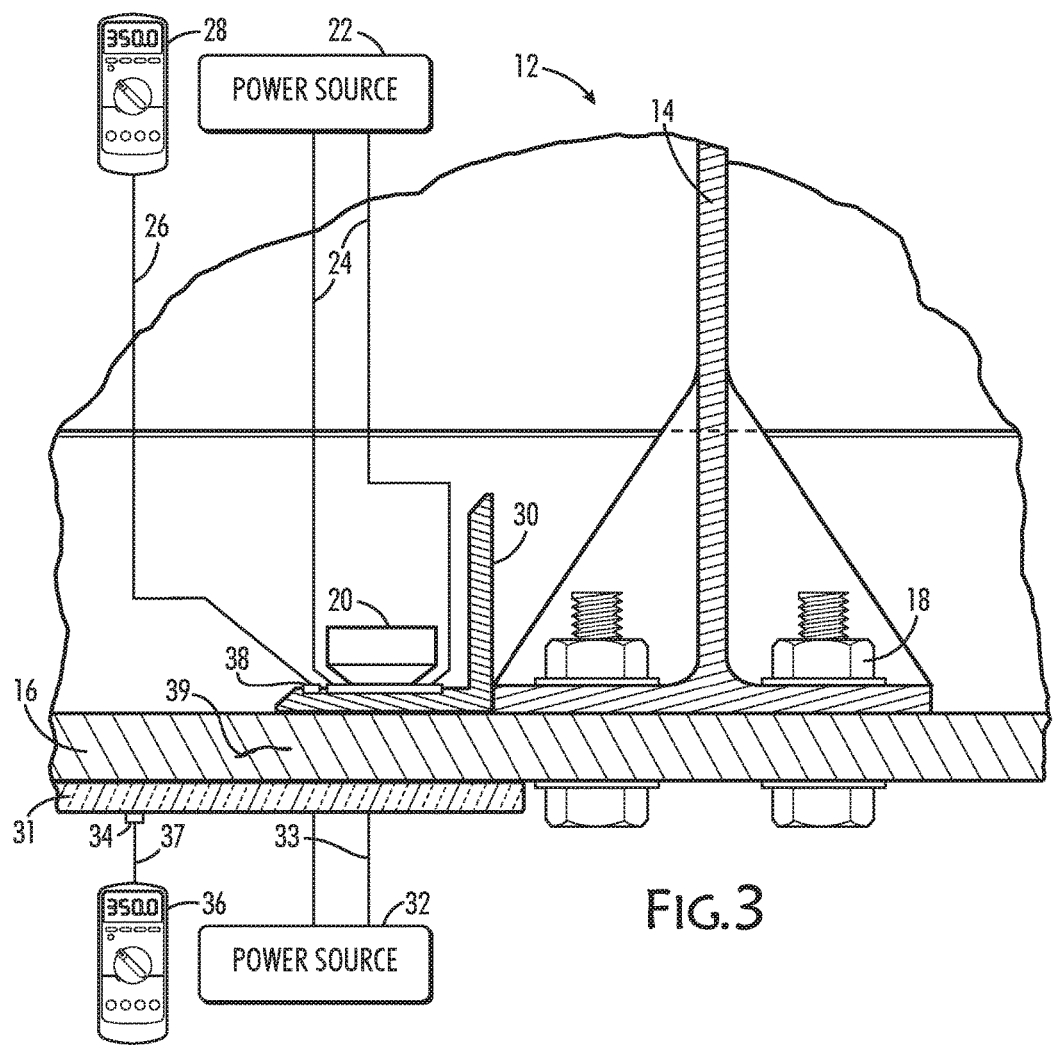
Figure 4:
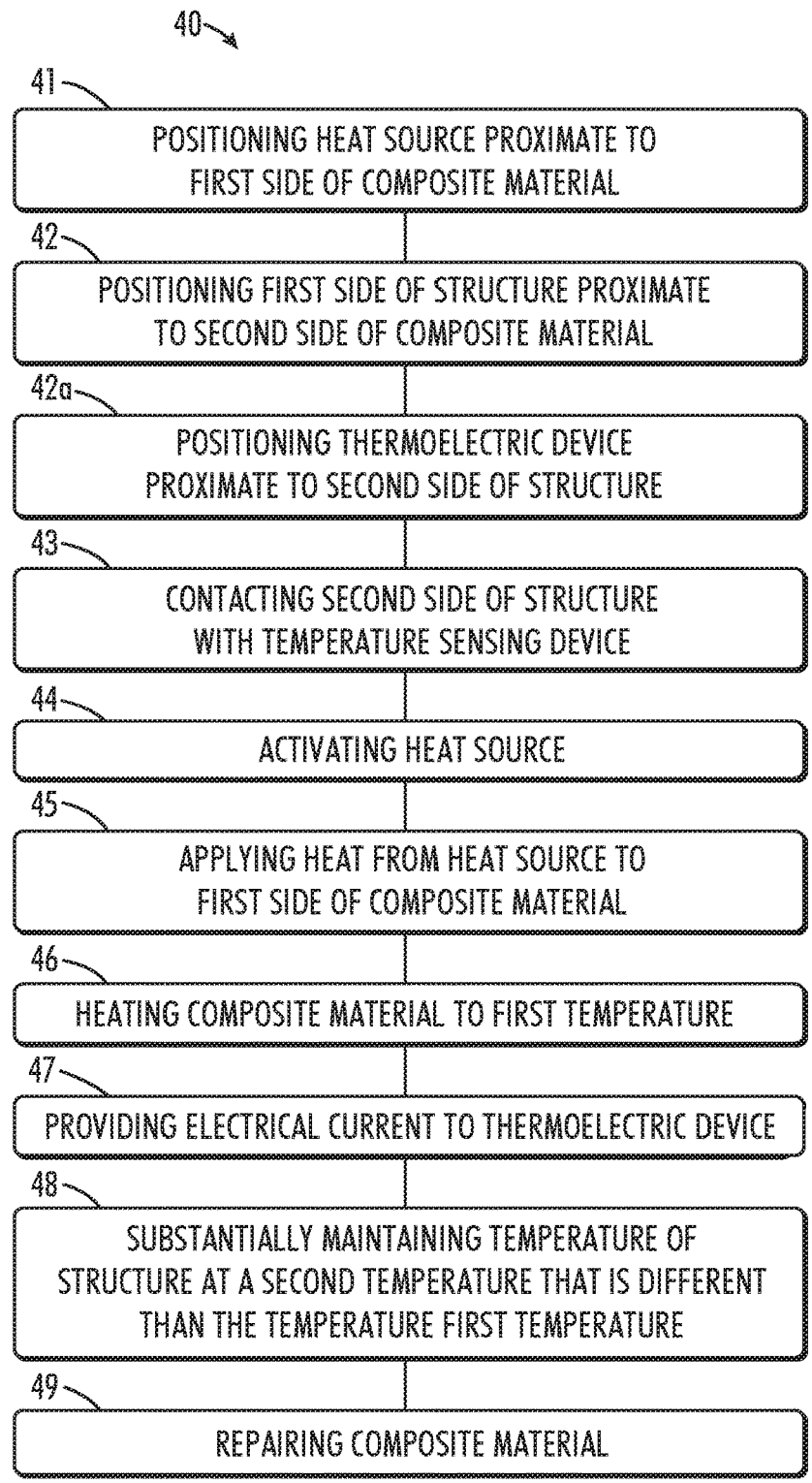

Having thus described variations of the disclosure in general terms, reference will now be made to the accompanying drawings, which are not necessarily drawn to scale, and wherein:

FIG. 1 is a perspective view of an aircraft;

FIG. 2 is a perspective view of an interior section of an aircraft showing an aspect of the present disclosure;

FIG. 3 is an enlarged, cross-sectional perspective view of an aspect of the present disclosure; and FIG. 4 is a flowchart outlining a method according to an aspect of the present disclosure.

DETAILED DESCRIPTION

The presently disclosed subject matter now will be described more fully hereinafter with reference to the accompanying Drawings (i.e. FIGs.), in which some, but not all aspects of the presently disclosed subject matter are shown. Like numbers refer to like elements throughout. The presently disclosed subject matter may comprise many different forms and should not be construed as limited to the aspects set forth herein; rather, many aspects are provided so that this disclosure will satisfy applicable legal requirements. Indeed, many modifications and other alternatives of the presently disclosed subject matter set forth herein will come to mind to one skilled in the art, to which the presently disclosed subject matter pertains having the benefit of the teachings presented in the foregoing descriptions and the associated Drawings. Therefore, it is to be understood that the presently disclosed subject matter is not to be limited to the specific aspects disclosed and that modifications and other aspects are intended to be included within the scope of the appended claims.

Aspects of the present disclosure are directed to methods, systems and apparatuses for the treatment and reworking and repair of composite materials in situ to remove composite material inconsistencies and/or irregularities without adversely impacting adjoining, adjacent or proximately-located component parts that may or may not be made from composite materials. For the purpose of this disclosure, the terms "inconsistencies" and "irregularities" are equivalent terms that are used interchangeably.

More particularly, aspects of the present disclosure are directed to methods, systems and apparatuses for, in situ, controlling the temperature of adjacent materials by substantially controlling and maintaining the temperature of one structure that is adjacent to another structure including, without limitation, a composite material being repaired or reworked. As disclosed herein the temperature of the first structure is maintained at a temperature different from and below the temperature of an adjacent composite material being reworked, with the difference between the temperature of the structure and the temperature of the composite material ranging from about 20° F. to about 150° F. For the purpose of this disclosure, the terms "adjacent" "adjoining" and "proximate" are equivalent terms that are used interchangeably.

According to aspects of the present disclosure, the treatments performed on the composite material needing repair or reworking is conducted in situ, without adversely impacting the temperature of components and parts located adjacent to or proximate to the composite material while the composite material to be repaired or reworked is in its installed position as a part of a larger structure, device or object, etc., including, without limitation, stationary objects such as buildings, etc., and mobile objects, such as vehicles, including, without limitation, manned and unmanned aircraft, spacecraft, terrestrial vehicles and surface and sub-surface marine vehicles, etc.

Aspects of the present disclosure contemplate methods, systems and apparatuses for direct and controllable local cooling of a thermally sensitive material that do not rely on cooling liquids, conditioned air, or any other heat transfer medium to impact temperature, but instead use a thermoelectric device using the Peltier effect of semiconductors to create a solid state, electrically driven local cooling device. If desired, it has now been determined that the thermoelectric device using the Peltier effect could be used (for example, by reversing current supplied to the thermoelectric device) to provide additional heat input in areas requiring alleviation of heat sinking.

FIG. 1 shows an aircraft 10 comprising an aircraft section 12 comprising at least one internal part made from a composite material. FIG. 2 shows a perspective interior view of an aircraft section 12. As shown in FIG. 2, in-spar rib 14 is shown attached to a wing skin lower panel 16 via fasteners 18. The wing skin lower panel 16 comprises a composite material. A thermoelectric device 20 is shown in place proximate to a shear tie 30. Shear tie 30 comprises a metal such as, for example an aluminum alloy. Thermoelectric device 20 is shown connected to a thermoelectric device power source 22 via power lines 24. Thermoelectric device 20 is also shown in contact with a first thermocouple (not shown), with the first thermocouple attached to thermocouple wires 26, with the thermocouple wires 26 connected to a first controller 28.

FIG. 3 is a cross-sectional perspective and enlarged view of the interior view of aircraft section 12 shown in FIG. 2, showing the thermoelectric device 20 in position proximate to shear tie 30. As shown in FIG. 3, in-spar rib 14 is shown attached to a wing skin lower panel 16 via fasteners 18 and showing the thermoelectric device 20 in position proximate to shear tie 30. The wing skin lower panel 16 comprises a composite material. Thermoelectric device 20 is shown connected to a thermoelectric device power source 22 via power lines 24, and also in contact with a first thermocouple 38, with the first thermocouple attached to thermocouple wires 26, with the thermocouple wires 26 connected to a first controller 28. As also shown in FIG. 3, a heat source 31 is shown in contact with a heat source power source 32 via heat source wires 33. A second thermocouple 34 is shown in contact with the heat source 31. Thermocouple wires 37 are shown in contact with the thermocouple 34 and second controller 36. Wing skin lower panel 16 is shown having a material irregularity 39 requiring repair and reworking.

FIG. 4 is a flowchart outlining a method 40 according to an aspect of the present disclosure comprising 41 positioning a heat source proximate to a first side of a composite material, 42 positioning the first side of a structure proximate to a second side of the composite material, 42a positioning a thermoelectric device proximate to the second side of the structure, 43 contacting the second side of the structure with a temperature sensing device, 44 activating the heat source, 45 applying heat from the heat source to the first side of the composite material, 46 heating the composite material to a first temperature, providing electrical current to the thermoelectric device, 48 substantially maintaining the temperature of the structure at a second temperature that is different than the first, and reworking the composite material. While the method shown in FIG. 4 comprises the step of heating the composite material before providing electrical current to the thermoelectric device, according to further aspects, current may be provided to the thermoelectric device concurrently with the step of applying heat from a heat source to a composite material, or current may be provided to the thermoelectric device before the step of applying heat from a heat source to a composite material.

According to an aspect of the present disclosure, the thermoelectric device is used to impact the temperature of a first structure that adjoins or is proximate to a second structure. In another aspect, the thermoelectric device is used to heat or cool, to a predetermined temperature, a first structure that adjoins or is proximate to a second structure. Still further, the thermoelectric device is a Peltier device using the Peltier effect to create a flux between the junction of two different types of material within the device. A Peltier cooler or heater is effectively a solid-state active heat pump that transfers heat from one side of the device to the other side of the device, with consumption of electrical energy, depending on the direction of the current. Peltier devices are also commonly referred to as a Peltier heat pump, a solid state refrigerator, a thermoelectric cooler (TEC), etc. As stated above, the Peltier device can be used to predictably heat or cool, and can be used in conjunction with a temperature controller that either heats or cools. When operated as a cooler, a voltage is applied across the device and a difference in temperature will build up between the two sides. When operated as a generator, one side of the device is heated to a temperature greater than the other side and a difference in voltage will build up between the two sides creating a so-called Seebeck effect.

Peltier devices are understood to be useful for applications that require heat removal ranging from milliwatts to several thousand watts. A single-stage Peltier device can produce a maximum temperature difference of about 70° C. between its hot and cold sides. According to the present disclosure, a plurality of Peltier devices may be arranged together to combine to give the required temperature differential needed to maintain a predetermined structure temperature. That is, a plurality of Peltier devices can be disposed on a substrate surface to run in series laterally, as desired. In the alternative, or in addition, a plurality of Peltier devices can be disposed on a substrate surface to run in series in a stacked orientation, as desired.

With respect to the Peltier device, two unique semiconductors, one n-type and one p-type are used since the materials in the device require different electron densities. The semiconductors are typically placed thermally in parallel to each and electrically in series and then joined with a thermally conducting plate on each side. When a voltage is applied to the free ends of the two semiconductors, a flow of DC current flows across the junction of the semiconductors causing a temperature difference. The side with the cooling plate absorbs heat which is then moved to the other side of the device where the heat sink is located. According to aspects of the present disclosure, Peltier devices may be connected side by side and positioned proximate to a material that adjoins a composite material that requires rework via heating. In this way, a structure that may be temperature sensitive can have the temperature of the structure regulated and controlled, even when the structure adjoins or is proximate to a composite material being reworked via heating, such as, for example, during a hot bonded repair.

According to aspects of the present disclosure, the Peltier devices are flexible or moldable, and are therefore able to contact a structure surface intimately, even if the structure comprises a complex shape and is otherwise non-planar. According to further aspects, more than one Peltier device is placed in contact with a surface of a structure that adjoins, or is otherwise proximate to a composite material requiring rework and repair via heating the composite material.

According to aspects of the present disclosure, when irregularities are discovered in a composite material, such material requires reworking, typically by applying heat according to hot bonding procedures understood in the field. Heat is supplied by a heat source such as, including, but not limited to, a heat blanket, heat lamps, hot air blowers, inductive heating elements, etc. To rework the composite material for the purpose of eliminating the irregularities, heat is applied to the composite material at a temperature up to about 350° F. for a predetermined duration. Adjacent or adjoining parts may not react well to a sustained heating of 350° F. For example, a metallic part, for example an aluminum alloy part that may be attached to, or otherwise adjoin the heated composite part may only be rated to be exposed to temperatures not to exceed about 200° F. As a result, in such cases, it will be desirable to maintain the metallic part at a temperature not to exceed about 200° F. The methods, systems and apparatuses of the present invention contemplate positioning a thermoelectric device such as a Peltier device proximate to the metallic part for the purpose of substantially maintaining the temperature of the part below about 200° F., or whatever temperature is desired or required. As used herein, the term "substantially maintained" or "substantially controlled" are equivalent terms, meaning that the temperature remains controllable or that the temperature is maintained within a range of from about +/−1° F. to about 5° F., allowing for temporary fluctuations that can be addressed by supplying more power or less power to the thermoelectric device for the purpose of temperature regulation at a defined, desired and/or predetermined value.

In addition, while aspects of the present application disclose the use of thermocouples to sense and monitor a surface temperature, it is understood that any means for measuring and relaying information regarding a temperature, and/or controlling or regulating a temperature can be used, including, without limitation, a non-contact infrared thermometer, a non-reversible temperature label, a wireless temperature monitoring device, etc., and combinations thereof. Useful controllers include, without limitation, controllers incorporated into, for example composite-specific repair bond consoles, such as those made by ATACS (Seattle, Wash.); Wichitech (Baltimore, Md.); BriskHeat (Columbus, Ohio); Heatcon (Tukwila, Wash.), etc.

Further, it is understood that the thermocouples and heat sources disclosed herein can be coupled appropriately with, or otherwise be in communication with, necessary controllers and software, hardware, computers and computer programs, etc. to run such software, hardware and controllers, etc. In addition, the methods, systems and apparatuses for controlling and maintaining the temperature of a material adjoining or located proximate to a heated composite material during reworking and repair may further be controlled to run remotely, and/or automatically, or may be operated manually, as desired.

According to further aspects, the present disclosure further contemplates that a thermoelectric device used for the purpose of maintaining a structure at a temperature that is different from an adjoining composite material is incorporated into or otherwise in communication with the control system of bond consoles used in controlling the heat input provided to the composite material for, for example, a reworking including, but not limited to, a hot bonded repair. In this way, according to aspects of the present disclosure, the desired heating and cooling functions can be automatically or manually controlled from a single controller, or, if desired, multiple controllers can be used, with the controller or controllers in communication with sensors positioned to sense temperature and then relay or signal information regarding the sensed temperature to the controller, or controllers.

EXAMPLE

According to an aspect of the present disclosure, the following protocol is contemplated. A repair of impact damage involving scarfing and rebuilding a composite wing skin is conducted. An interior section of wing skin lower panel is oriented adjacent to an aluminum shear tie. The shear ties are made from aluminum alloy 2024, although any metallic or non-metallic material that cannot safely be exposed to temperatures above, for example, 200° F. without incurring an adverse effect on fatigue properties is contemplated, including, without limitation, aluminum alloy 2024, 7050, 7075, etc. A thermoelectric device (Peltier device) is placed on the shear tie "foot" as shown in FIG. 2 as (20). Thermocouples are placed at multiple locations along the shear tie "foot", and are attached via thermocouple wires to a thermoelectric device controller. The controller is set to maintain the temperature of the shear tie "foot" at a temperature not to exceed 200° F. during an entire cure cycle of the skin repair. The Peltier device is then activated. A heat source is placed proximate to a wing skin made from a composite material. The heat source is activated and the skin is then cured at 350° F. while the thermoelectric device maintains the temperature of the shear tie "foot" at a temperature not to exceed 200° F.

The variations and alternatives of the present disclosure relate to the manufacture and use of components and parts such as, for example, composite component parts of any dimension, including the manufacture and use of components and parts in the fabrication of larger parts and structures. Such devices include, but are not limited to, components and parts designed to be positioned on the exterior or interior of stationary objects including, without limitation, general construction objects, buildings, etc. Further objects include, without limitation, atmospheric and aerospace vehicles and other objects, and structures designed for use in space or other upper-atmosphere environments such as, for example, manned or unmanned vehicles and objects. Contemplated objects include, but are not limited to vehicles such as, for example, manned and unmanned aircraft, spacecraft, rotorcraft, satellites, rockets, missiles, terrestrial vehicles, non-terrestrial vehicles, and even surface and subsurface water-borne vehicles and objects.

When introducing elements of the present disclosure or exemplary aspects thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific aspects, the details of these aspects are not to be construed as limitations. While the preferred variations and alternatives of the present disclosure have been illustrated and described, it will be appreciated that various changes and substitutions can be made therein without departing from the spirit and scope of the disclosure.

What is claimed is:

1. A method comprising:
   positioning a heat source proximate to a first side of a composite material, said composite material having a first side and a second side, with a structure located proximate to the second side of the composite material, said structure having a first side and a second side, with the first side of the structure located proximate to the second side of the composite material;
   positioning a thermoelectric device proximate to the second side of the structure, said thermoelectric device in communication with a controller;
   contacting the second side of the structure with a temperature sensing device, said temperature sensing device in communication with the controller;
   activating the heat source;
   applying heat from the heat source to the first side of the composite material;
   heating the composite material to a first temperature;
   providing an electric current to the thermoelectric device; and
   substantially maintaining the temperature of the structure at a second temperature that is different than the first temperature of the composite material.

2. The method of claim 1, wherein, in the step of positioning a heat source proximate to a first side of a composite material, the heat source comprises a heat blanket.

3. The method of claim 1, wherein, in the step of positioning a heat source proximate to a first side of a composite material, the structure comprises a material different from the composite material.

4. The method of claim 1, wherein, in the step of positioning a heat source proximate to a first side of a composite material, the structure comprises a metallic material.

5. The method of claim 1, wherein, in the step of positioning a thermoelectric device proximate to the second side of the structure, the thermoelectric device is a Peltier device.

6. The method of claim 5, wherein the Peltier device is moldable to contact a non-planar surface.

7. The method of claim 5, wherein the thermoelectric device comprises a plurality of Peltier devices configured in series.

8. The method of claim 5, wherein the thermoelectric device comprises a plurality of Peltier devices configured in a stacked orientation.

9. The method of claim 1, wherein, in the step of substantially maintaining the temperature of the structure at a second temperature that is different from the first temperature of the composite material, the second temperature is maintained at a temperature that is less than the first temperature of the composite material.

10. The method of claim 1, wherein, before the step of substantially maintaining the temperature of the structure at a second temperature that is different from the temperature of the composite material, further comprising monitoring the temperature of the structure.

11. The method of claim 1, wherein, in the step of substantially maintaining the temperature of the structure at a second temperature that is different from the temperature of the composite material, the temperature difference between the second temperature of the structure and the first temperature of the composite material ranges from about 20° F. to about 150° F.

12. The method of claim 1, further comprising:
   repairing the composite material.

13. The method of claim 1, wherein the structure comprises a non-metallic material.

14. The method of claim 1, wherein the controller is configured to control a current directed from an electric source to the thermoelectric device.

15. The method of claim 1, wherein the thermoelectric device comprises a thermocouple.

16. The method of claim 1, wherein the thermoelectric device is in communication with a thermocouple.

17. The method of claim 1, further comprising the step of reworking the composite material in-situ.

\* \* \* \* \*